Feb. 22, 1966 R. WISOTZKY 3,236,926
PROCESS OF MAKING RESILIENT ELASTOMERIC FLOOR COVERINGS
Filed Aug. 23, 1962
FIG. 1
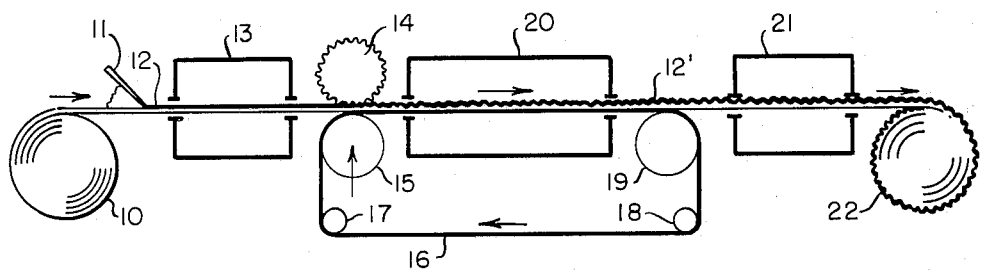
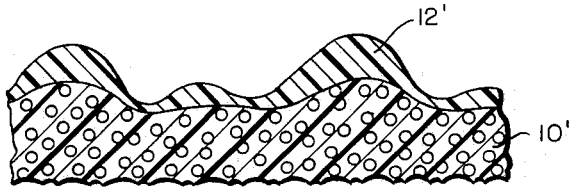
FIG. 2
INVENTOR.
Reuben Wisotzky
BY
Kenway, Jenney & Hildreth,
Attys.

United States Patent Office 3,236,926
Patented Feb. 22, 1966

3,236,926
PROCESS OF MAKING RESILIENT ELASTOMERIC FLOOR COVERINGS
Reuben Wisotzky, Lexington, Mass., assignor to American Biltrite Rubber Co., Inc., Chelsea, Mass., a corporation of Delaware
Filed Aug. 23, 1962, Ser. No. 219,028
5 Claims. (Cl. 264—47)

This invention comprises a new and improved resilient elastomeric flooring or wall covering and includes within its scope a novel process of making the same.

The product of my invention is characterized by a bottom or base layer having a sponge-like or blown consistency thus providing maximum resiliency and deflection under local pressure and having its inner or concealed surface molded to present a three-dimensioned contour of waves, ridges, valleys and hollows. To this base cushion layer is bonded an upper wear resisting layer which is embossed or molded to correspond to the contour of the underlying layer, that is to say, the wear resisting layer is so distributed that it has maximum thickness above the ridges or waves of the base layer and minimum thickness above the valleys and hollows. Thus the wear resisting layer is disposed with its greatest thickness in those parts of the covering which are subjected to the greatest wear in use.

The process of my invention is characterized by the steps of continuously coating with plastisol an elastomeric sheet containing a blowing agent, molding a three-dimensional contour in a plastisol coating and then simultaneously fusing the molded plastisol and blowing the underlying elastomeric sheet.

Preferably and as herein shown the elastomeric sheet is molded at the same time as its jelled coating and the coating is distributed thereon in the manner above explained. The coating step is carried out while the elastomeric sheet is still of the firm consistency imparted to it in the calendering operation so that the molding step takes place upon the firm foundation of the calendered strip and before the latter is blown.

These and other features of the invention will be best understood and appreciated from the following description of a preferred embodiment of the covering and of apparatus for making the same as shown in the accompanying drawings in which:

FIG. 1 is a diagrammatic view of the apparatus and
FIG. 2 is a fragmentary sectional view of the product on a somewhat enlarged scale.

The flooring of the present invention comprises an underlying layer or ply 10′ of elastomeric material which has been blown or otherwise rendered of spongy cushioning consistency. The upper surface of the ply is shown as molded to present a three-dimensional contour of waves or ridges alternating with the valleys or hollows. To the underlying ply is bonded an elastomeric cover layer 12′ which may be of translucent or transparent wear resisting composition and which is distributed so that its thicker portions coincide with the waves or ridges of the underlying ply 10. The wear resisting coating is thus distributed so that its thicker portions lie in the areas in which the product is subjected to maximum wear.

Apparatus for continuously making the product of FIG. 2 is diagrammatically shown in FIG. 1 in which elastomeric sheet material 10 is drawn from a coil or reel and passed beneath a doctor blade 11 by which plastisol of viscous consistency is uniformly spread upon the underlying sheet. The underlying sheet may consist of stock prepared by calendering, tubing or otherwise, being initially of firm consistency although having a suitable blowing agent distributed therein. The sheet must be formed at a temperature below that of the blowing temperature range which may be from 300–400° F.

The smooth calendered sheet is coated with the plastisol by the blade 11 as shown or by rolling or spraying. The coated sheet is now passed through a drying oven 13 heated to a temperature sufficient to jell the plastisol coating 12′ but not high enough to fuse it or to blow the underlying layer 10.

The combined layers are next fed to an embossing unit herein shown as comprising an embossing roll 14 and a supporting roll 15. In this step the dried jell ply is embossed with an ornamental surface pattern and, with the underlying elastomeric ply, is molded to present the three-dimensional contour suggested in FIG. 2. It will be understood that up to this point the underlying sheet 11 maintains its original firm consistency, passing unchanged through the coating and drying steps.

At the embossing roll 14 the superposed plies are picked up and advanced by a conveyor belt 16 herein shown as running over the supporting roll 15 and guide rolls 17, 18 and 19 in a rectangular path which carries the plies through a blowing oven 20 heated to a temperature sufficiently high for fusing the cover layer 12′ and for blowing the underlying layer 10′. At the same time in passing the roll 15 the conveyor belt which may be of duck or other textile fabric forms a textile impression upon the bottom side of the elastomeric ply 10′ as suggested in FIG. 2. The action of the embossing roll 14 against a plain supporting roll 15 is of importance because embossing takes place on the fully jelled but unfused wear resisting ply 12′ resulting in a permanent embossing effect which is practically unaffected by the subsequent fusing and blowing operations which follow it. The final result is a permanently stable embossed surface contour backed and supported by a blown resilient ply forming a composite construction of attractive appearance, stability and resiliency.

The covering may be produced in solid colors or the base layer may be printed and otherwise provided with a decorative pattern before being coated with a translucent or transparent wear resisting ply.

In practice it has been found advantageous to operate the drying heater 13 at a temperature of from 200° F. to 280° F., whereas the fusing and blowing oven 20 should be heated to between 300–400° F.

Upon leaving the conveyor belt 16 the composite product is carried through a cooler 21 and passing this the complete product may be reeled in a coil 22 for shipment.

The coverings herein described may be made from any suitable elastomeric thermoplastic compound of rubber or synthetic resin, such as plasticized vinyl chloride resin or other vinyl resin compound, or from polyethylene. These compounds are well known in the industry and readily available in the open market.

Having thus disclosed my invention and described in detail illustrative embodiments thereof, I claim as new and desire to secure by Letters Patent:

1. The continuous process of making composite resilient elastomeric floor coverings characterized by the steps of coating with jelled plastisol an elastomeric sheet of firm consistency containing a blowing agent, molding a three-dimensional contour in the jelled coating while supported by the elastomeric sheet and then simultaneously fusing the molded plastisol and blowing the underlying elastomeric sheet, thus conforming it to the three-dimensional contour of the fused plastisol.

2. The process of making composite resilient elastomeric floor or wall coverings, comprising the steps of:
forming a sheet of elastomeric material of firm consistency and substantially uniform thickness having a blowing agent distributed therein, applying to said sheet a uniform and continuous coating of plastisol, jelling the plastisol coating while supported upon the sheet, molding ridges and valleys in the jelled plastisol while so supported, and fusing the molded plastisol and blowing the underlying elastomeric sheet at the same time uniting the jelled plastisol to the blown elastomeric sheet and conforming the latter to the ridges and valleys of the jelled plastisol.

3. The process of making resilient elastomeric floor or wall coverings, comprising the steps of:

calendering a sheet of elastomeric material having firm consistency and a blowing agent distributed therein, applying to the calendered sheet a uniform and continuous coating of plastisol, heating the coated sheet sufficiently to jell the plastisol coating while the latter is supported on the firm elastomeric sheet, progressively molding ridges and valleys in the jelled plastisol, and conveying the resulting product through a zone of sufficient temperature to fuse the molded plastisol and blow the elastomeric sheet thereby conforming it to the ridges and valleys of the fused plastisol.

4. The process of making an elastomeric floor covering, comprising the steps of coating with a viscous plastisol the surface of a solid sheet of elastomeric material having a blowing agent distributed therein and being of firm consistency, heating the coated sheet until the platsisol coating is converted to a jell formation, molding ridges and valleys in the jelled plastisol while supported by the solid elastomeric sheet, and heating the resulting product to blow the elastomeric sheet, uniting it to the fused plastisol and conforming it to the ridges and valleys thereof.

5. The process of claim 4, further characterised by the step of imparting an embossed surface finish to the jelled plastisol simultaneously with molding ridges and valleys therein.

References Cited by the Examiner

UNITED STATES PATENTS

| | | | |
|---|---|---|---|
| 2,032,114 | 2/1936 | Clements et al. | 161—73 |
| 2,373,194 | 4/1945 | Luttge | 161—73 |
| 2,404,073 | 7/1946 | Karfiol et al. | 156—209 |
| 2,816,852 | 12/1957 | Banks. | |
| 2,817,618 | 12/1957 | Hahn | 156—209 |
| 2,875,088 | 2/1959 | Stiehl et al. | 117—10 |
| 2,918,702 | 12/1959 | Wettereau | 264—47 |
| 2,943,949 | 7/1960 | Petry | 264—47 |
| 2,979,835 | 4/1961 | Scholl. | |

EARL M. BERGERT, *Primary Examiner.*